Dec. 5, 1967  L. A. ATTERMEYER  3,356,324

MACHINERY LEVELING PAD AND ANCHOR DEVICE

Filed Feb. 16, 1966

INVENTOR.
Lawrence A. Attermeyer

BY
ATTORNEYS

United States Patent Office 3,356,324
Patented Dec. 5, 1967

3,356,324
MACHINERY LEVELING PAD AND
ANCHOR DEVICE
Lawrence A. Attermeyer, Cincinnati, Ohio, assignor to
The Cincinnati Milling Machine Co., Cincinnati, Ohio,
a corporation of Ohio
Filed Feb. 16, 1966, Ser. No. 527,692
8 Claims. (Cl. 248—2)

ABSTRACT OF THE DISCLOSURE

A device for securing machinery to a supporting surface which device is particularly suited for adhesive attachment to the supporting surface. The device is arranged to reduce stress concentrations by applying load forces over an annular area and thereby it reduces the tendency for peeling of the adhesive bond. The device further permits limited lateral adjustment of the machinery relative thereto such that initial coarse alignments can be followed by fine alignments after the device is attached to the supporting surface.

---

This invention relates to hold-down and leveling pads for securing a machine to a foundation or shop floor.

It has been the common practice for a long period of time to secure machinery such as machine tools to their supporting concrete foundations by means of lag screws or the like that are engaged in bushings which are imbedded in the concrete foundation. This requires considerable preparation for each machine including the opening of holes in existing floors and the recasting of concrete in these holes with the bushings both when the machine is relocated in a plant or when it is new equipment to be installed. This is time consuming and expensive and requires very accurate location of the bushings. In addition, when a machine is removed or relocated the openings in the floor remain to create problems in housekeeping and safety. Therefore the unused bushings are frequently removed and the resulting hole is patched. This adds to the expense and inconvenience of alterations in plant layout and organization.

It is therefore the primary object of this invention to provide a machine tool anchor device which is easily and accurately installed and quickly removed without requiring extensive preparation and repair of concrete floors and foundation before installation and after removal.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

For a period of time now, various adhesive compounds such as epoxy resin cements have been available which will provide a very strong tensile strength bond between a metal foot plate and a concrete foundation, these have not been adapted for use under machines to hold them in place due to the weakness of such bonds when subjected to forces tending to peel the foot plate from the floor. The peeling forces are very common in machine tool anchor applications. The present invention is for a foot plate anchor assembly especially developed to greatly reduce the tendency toward the peeling forces that have in the past discouraged the use of adhesively applied anchors under machine tools. This reduction of the peeling forces is accomplished by a physical arrangement of the device such that there is no tendency for concentration of forces at any edge area of a foot plate where peeling normally would start.

Summarizing the invention herein, it is a device for securing a machine to a floor or supporting surface in cooperation with an adhesive. A lower plate is adapted to be adhesively bonded to the floor and a smaller upper plate is fixed thereto by means of a narrow annular or peripheral bearing area to transmit forces therebetween over an enlarged area that does not concentrate stress at any edge of the base plate. The machine is fixed at or near the center of the upper plate which center is maintained spaced from the lower plate. Provision is made in one embodiment for limited adjustment of the point of attachment of the machine to the upper plate by means of a laterally adjustable coupling unit that facilitates both initial alignment of the anchor device and machine prior to adhesion of the lower plate to the floor and final alignment of the machine after the adhesive component is set.

A clear understanding of the construction and use of the invention can be obtained from the following detailed description in which reference is made to the attached drawings wherein.

Figure 1:
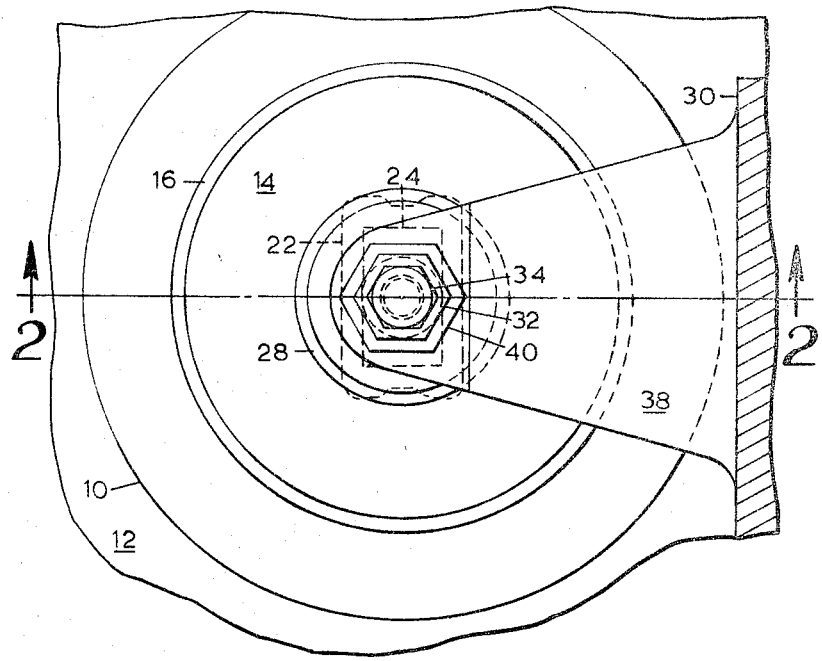
FIG. 1 is a plan view of an anchor device to which a machine tool base is attached.
Figure 2:
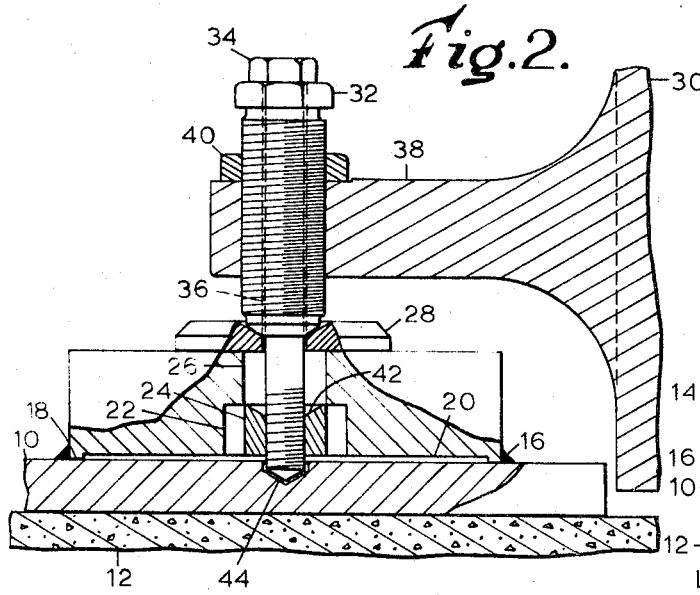
FIG. 2 is a cross sectional view of the device of FIG. 1 on line 2—2 thereof.
Figure 3:
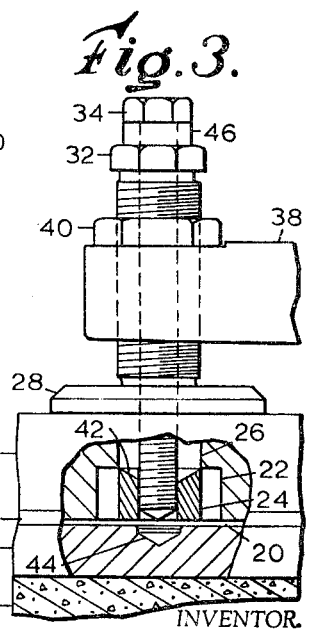
FIG. 3 is a view partly in section and partly in elevation of the device of FIG. 1 as finally secured for use.

A machine tool is normally held in place by a number of anchors and each of these is like the others. Therefore a specific one of the supporting assemblies of this invention is shown in FIGS. 1–3. It is understood that a plurality of these will be used with any single machine installation. Each of the machine tool supporting foot plate assemblies of this invention is comprised of a base plate 10 which is adapted for receipt directly on a concrete shop floor 12. The surfaces of contact between the base plate 10 and floor 12 are cleaned of all dirt and oil and coated with an adhesive compound in a manner to be described in detail later herein prior to the placing of the base plate 10 onto the floor 12. The base plate 10 is backed by an upper plate 14 that is secured centrally on the base plate 10 by a fillet weld 16 in the example shown. The upper plate 14 might also be joined integrally with the base plate 10 by other means such as friction welding. As shown best in FIG. 2, the upper plate 14 rests against the base plate only at the narrow band of a rim 18 around the periphery of the face next to base plate 10 since the large central area of the upper plate 14 has been relieved in a facing cut to provide a space 20 between the major portion of the area between the upper plate 14 and the base plate 10. Due to the relieving of the upper plate 14 and since it is substantially smaller in its diameter or transverse dimension than the base plate 10 and is centrally located thereon, forces transmitted to and from the base plate 10 are spread over an annular area around the base plate that is inward from its peripheral edge. By applying the substantial downward load of the machine over an area that is spaced inward from the periphery of the plate 10, high compressive forces that might exceed the strength of the floor 12 are eliminated by the more equal spreading of these forces over the area of the plate 10. The forces are also concentrated to a much lesser extent at the center of the base plate 10 to reduce the tendency of the plate 10 to peel from the floor 12. It is pointed out that the application of downard forces at the center of the plate 10 would create substantial peeling forces by their tendency to curl the plate 10 upward at its peripheral edges so that these downward forces would be responsible to a great extent for the tendency of the plates to peel from the floor 12 if it were not for the construction described. Any substantial upward forces tending to lift the machine and having a lateral force component might also cause peeling if these were applied around the edge of the base plate 10 rather than toward its center.

The upper plate 14 also has a recess 22 formed in the side next to the base plate 10 and a rectangular nut 24 is loosely placed in the space provided by the recess 22 prior to the attachment of these two plates together. The recess 22 is shaped such that the nut 24 is prevented from moving to any position where its center is located outside of an area directly below a clearance opening 26 that extends through the upper plate 14 from its top side to the recess 22. A support ring 28 is placed loosely on top of the upper plate 14 and this completes the supporting foot plate assembly.

A machine base 30 is attached to the assembly by means of a supporting stud 32 and a tie down bolt 34 that extends through a central axial passage 36 in the stud 32. The stud 32 is threaded along its length and is engaged through a mating threaded bore in a lug 38 integral with and laterally extending from the side of the base 30. A lock nut 40 is engaged over the stud 32 and when the stud 32 is at a selected position in the lug 38 the nut 40 is turned securely against the lug 38 to fix the stud 32 in position. The bolt 34 passes through the stud 32, the ring 28, upper plate 14 and is threaded into the nut 24 to provide the hold down forces to prevent the lug 38 and base 30 from moving upward away from the supporting assembly. The nut 24 is provided with a conical depression 42 around its center threaded hole so that when the bolt 34 is first inserted, the nut 24 will be cammed to a center position relative to the bolt 32 even though it might initially be at one side or another of the recess 22. A portion of the conical surface 42 will always be directly below the clearance hole 26 and engageable by the bolt 34 if the center of the nut cannot move laterally to a position where it is not below the area of the opening 26. The recess 22 is sized and shaped such that the bolt 34 will always engage the conical surface 42 to shift the nut 24 to a position to engage properly with the bolt 34.

When the machine base 30 is initially positioned and the base plates 10 are cemented to the shop floor 12, the supporting assemblies and hold down studs 32 and bolts 34 are arranged as shown in FIG. 2. In each assembly, the bolt 34 is axially dimensioned so that when it is engaged through its nut 24 and tightened down firmly, its lower end extends into a counter bore 44 located at the center of the top surface of its base plate 10. These anchor devices are attached to the machine while the machine base 30 is supported at a higher than normal location above the floor 12 by jacks, cranes, or similar mechanisms. This causes each of the complete assemblies to be centralized one part to the next as shown in FIG. 2. The adhesive is then applied to the lower surfaces of the base plates 10 and to the spots on the floor 12 directly below them which have been cleaned to insure optimum adhesive bonding. The machine base 30 is then lowered until it is supported directly by the floor 12 and the supporting assemblies and the adhesive is allowed to cure.

Leveling and final alignment of the base is accomplished after the adhesive has cured. Leveling is accomplished in the normal manner by unlocking the nuts 40 from the lugs 38 and axially shifting the studs 32 relative to the respective lugs 38. Lateral alignments of the base 30 cannot be made with the bolts 34 extending into their respective centralizing holes 44, however. Therefore before final alignment, the bolts 34 are withdrawn and a spacer 46 is placed on each adjacent to its upper end. The bolts 34 are then re-inserted loosely in place. Now their lower ends are above the base plates 10 and lateral adjustments can be made within the range permitted by the opening 26 and recess 22 in each device. Since the machine base 30 is fairly accurately located prior to its placement for support on the floor 12, the range provided is adequate for final alignment. After alignment, the bolts 34 are turned down tightly in the nuts 24 so that the machine base 30 cannot lift away from the floor 12.

In order that a firm and effective bonding be achieved between the base plates 10 and the floor 12, the surfaces of each must be thoroughly cleaned to eliminate dirt and oil on each. The floor 12 is ordinarily scrubbed with commercial soap compounds and allowed to dry completely. A good solvent is then used to clean both the base plates 10 and areas of the floor 12 where the base plates 10 will be placed to eliminate all oil. It is important that this solvent leave a very low amount of residue upon evaporation so that the surfaces are very clean. An example of a solvent that has been found effective in the application of the present invention is a compound sold under the trademark Chlorothene by the Dow Chemical Co., Midland, Mich. After cleaning with the solvent, it is recommended that an abrasive be used on the floor 12 to further clean its surface and that any residue from this be removed by an air blast or by an effective vacuum cleaning. The adhesive compound is then applied to the engaging surfaces of the base plates 10 and floor 12 and the machine base to which the supporting assemblies have been connected is lowered until it is supported by the floor 12 through these assemblies. An example of a satisfactory adhesive compound is that sold by the Interchemical Corp., Clifton, N.J. under the manufacturer's designation SRF–403 Adhesive, parts A and B, in the general class of thermosetting adhesives usually termed epoxy resin cements and which is mixed in equal parts prior to application. The cement is allowed to cure and then leveling and final alignment are performed. Since the structure of the base plate 10 and upper plate 14 in combination insures that no forces are applied in high concentration at the center or the edge of the base plate 10, the tendency for peeling of the adhesive bond is greatly reduced. It has been found that as a result of this reduction of the tendency to peel, a satisfactory securing of the machine base 30 to floor 12 can be achieved by the assembly and the described installation thereof. It is pointed out that adhesive bond of the resin cement of the class specifically described breaks loose when the base plate is heated to a temperature in the range of about 180° F. for five minutes, and therefore by the simple expedient of heating the base plates 10, as by an acetylene torch, the plates 10 can be removed from the floor 12 without damage to either the floor or the supporting assemblies which can be cleaned and reused in other locations.

What is claimed is:

1. A device for securing a machine to a floor in cooperation with an adhesive, the device comprising:
   (a) a base plate having a flat bottom side adapted for adhesive attachment to the floor,
   (b) an upper plate substantially smaller in the transverse dimensions than said base plate,
   (c) means for fixing said upper plate centrally to the top side of said base plate at a narrow band around the periphery of the lower side of said upper plate, the area of the lower side of said upper plate inside said narrow band being held spaced from the top side of said base plate, and
   (d) means for attaching the machine to said upper plate at a middle location thereon.

2. The device of claim 1 wherein:
   (a) said means for fixing is a narrow rim around the periphery of the lower side of said upper plate welded to said base plate.

3. The device of claim 1 wherein:
   (a) means are provided for permitting attachment of said machine within a predetermined range of positions in the center area of said upper plate, and
   (b) means are provided for initially aligning said upper plate with the machine for attachment at its center prior to relative lateral movement therebetween for machine alignment after adhesive attachment of the base plate to the floor.

4. The device of claim 1 wherein said last recited means includes:

(a) a stud adapted for connection to the machine,
(b) means for pulling said stud toward said upper plate,
(c) means for limiting the movement of said stud toward said upper plate to a fixed position whereby said means for pulling and for limiting hold said stud in a fixed position on said upper plate.

5. The device of claim 4 wherein:
(a) said upper plate has a clearance hole extending centrally therethrough,
(b) said stud has an opening extending axially therethrough, and
(c) said means for pulling includes a nut loosely received between said upper and base plates and a bolt extending through said stud opening and upper plate clearance hole to engage said nut.

6. The device of claim 5 wherein:
(a) said nut includes a threaded hole therethrough and a conical depression in the top side thereof around said threaded hole, and
(b) means are provided for limiting movement of said nut transversely beneath said upper plate clearance hole to a locus of positions wherein said conical depression is always partly exposed directly below said upper plate clearance hole.

7. The device of claim 6 wherein:
(a) said base plate has a counter-bore in the top side thereof centered directly below said upper plate clearance opening and adapted to receive said bolt at the forward end thereof, and
(b) said bolt is of sufficient length to extend through said stud, upper plate and nut into said base plate counter-bore to center said stud, bolt and nut relative to said base and upper plates.

8. The device of claim 7 wherein:
(a) a spacer is provided for insertion between said bolt and stud after initial centering alignment to effectively lengthen said stud and prevent the extension of said bolt into base plate counter-bore, and
(b) said upper plate clearance opening permits a predetermined range of transverse adjustment of said stud, bolt and nut for machine alignment.

References Cited

FOREIGN PATENTS 117,486    4/1958    U.S.S.R.

ROY D. FRAZIER, *Primary Examiner.*

CHANCELLOR E. HARRIS, *Examiner.*

F. DOMOTOR, *Assistant Examiner.*